Sept. 18, 1928.  F. A. HUBBARD  1,684,397

ELECTRICAL TESTING

Filed Dec. 31, 1924    2 Sheets-Sheet 1

Inventor:
Francis A. Hubbard
by E. W. Adams, Atty.

Sept. 18, 1928.  1,684,397
F. A. HUBBARD
ELECTRICAL TESTING
Filed Dec. 31, 1924  2 Sheets-Sheet 2
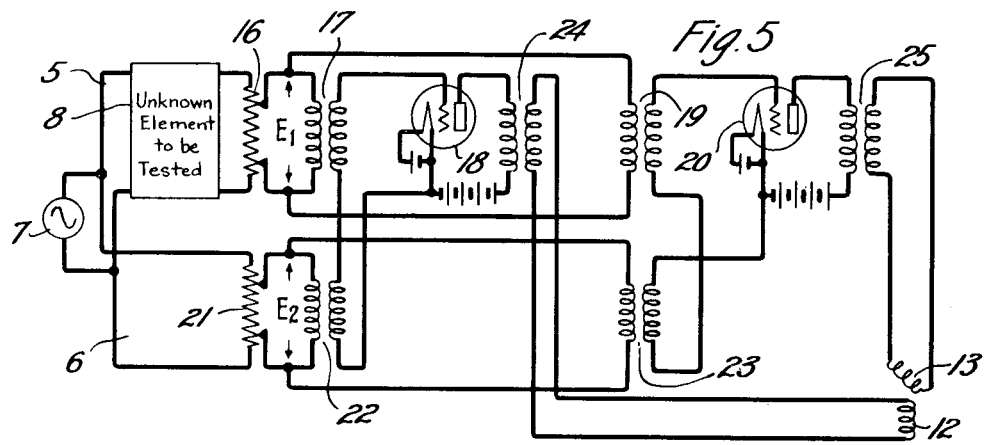
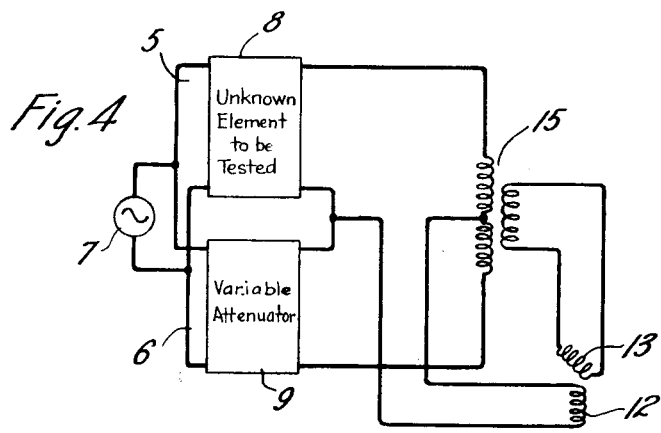
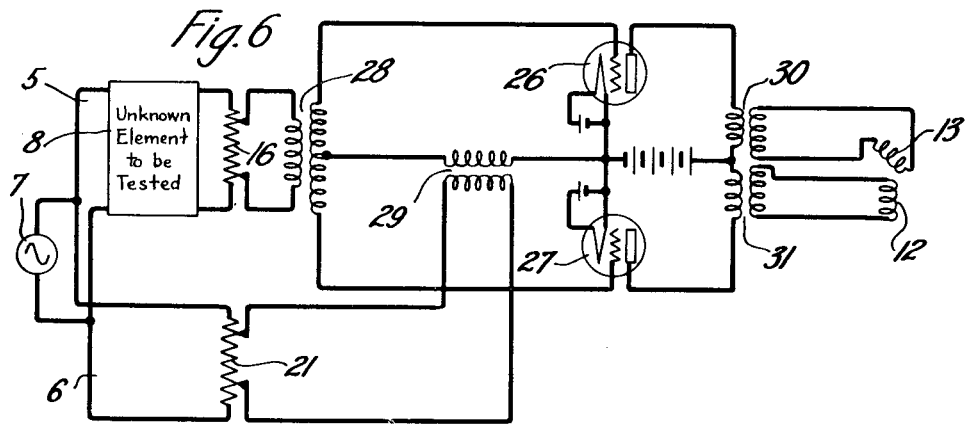
Inventor:
Francis A. Hubbard
by ℰ.W.Adam Atty.

Patented Sept. 18, 1928.

1,684,397

UNITED STATES PATENT OFFICE.

FRANCIS A. HUBBARD, OF WYOMING, NEW JERSEY, ASSIGNOR TO WESTERN ELECTRIC COMPANY, INCORPORATED, OF NEW YORK, N. Y., A CORPORATION OF NEW YORK.

ELECTRICAL TESTING.

Application filed December 31, 1924. Serial No. 758,978.

This invention relates to electrical testing and involves a novel basic principle of operation widely applicable in the electrical arts.

An object of the invention is to simplify the examination and measurement of electrical characteristics.

A related object of the invention is to determine with accuracy and precision the characteristics of electrical circuits and apparatus.

Another object of the invention is to determine the characteristics of an unknown element by comparing the voltages in two branches of a testing system independently of their phase relation.

Another object of the invention is to provide a simple and accurate system for the measurement of transmission equivalents.

Electrical testing systems are commonly operated on a comparison basis. That is, an indicating device is transferred by means of a key from a calibrating circuit to a circuit containing the unknown element under test, and the calibrating circuit is adjusted until equal readings are obtained for the two positions of the key. This method has been preferred to the method of opposing the voltages in the test and calibrating circuits because the phases of the two voltages will, in general, be different.

In a system of the above type, however, it is necessary to make a number of trial balances before an approximately true balance is obtained. There is also an element of uncertainty inherent in this method since it involves a comparison of successive observations.

It has also been proposed to rectify the currents in the test and calibrating circuits and oppose the resultant continuous voltages; but this method presents serious difficulties because of unavoidable differences in the characteristics of available rectifiers.

The difficulties outlined above are overcome in the present invention which provides a method of and means for obtaining an immediate and accurate indication of the characteristics of the element under test by comparing the voltages in two branches of a testing system regardless of their relative phases.

The magnitudes of the voltages in the two branches of the system may be compared by measuring the product of their vector sum, their vector difference, and the cosine of the angle between their sum and their difference.

In a specific embodiment of the invention, a testing current is applied to a test circuit and a calibrating circuit. The sum and difference of the voltages in these circuits are then applied differentially to the coils of a sensitive indicating device, such as a dynamometer.

In such a system, the indicating device will give a zero reading when the voltages in the two circuit branches are equal, regardless of their relative phases. This is an embodiment of the principle, hereinafter more fully described, that when two voltages of the same frequency are equal, their sum and difference will be 90 degrees apart in phase, regardless of the phases of the original voltages; and unless the voltages are equal, their sum and difference cannot be at right angles. Hence, the electrical characteristics of the element under test may be measured in the calibrating branch of the circuit when this branch has been adjusted until the two voltages are equal. The electrical characteristics of the element under test may also be determined by a direct reading of the indicating device in the system outlined above. In accordance with the invention, the force acting on the indicating device, as hereinbefore more fully explained, is proportional to the difference of the squares of the absolute values of the two voltages regardless of their relative phases. Hence, the indication obtained of the difference between the voltage values in the two branches of the circuit is a direct measure of the difference between their values regardless of phase. The indicating device may therefore be calibrated to read in any desired units for a given standard value of voltage in one branch of the circuit.

One of the important embodiments of the invention is in the measurement of transmission equivalents. In telephone practice, for example, it is customary to express the transmission loss of an electrical device or circuit as the number of transmission units, or of miles of standard cable, which would cause the same loss, these values being termed the "transmission equivalent" of the device or circuit. The transmission loss of the device or circuit under test may therefore be given in terms of the transmission equivalent thereof, but it is to be understood, of course, that the loss may also be measured in any other suitable terms in accordance with the invention.

The various features and advantages of the invention will be apparent from the following description taken in connection with the accompanying drawings, in which:

Figs. 4, 5 and 6 are diagrammatic illustrations of modified systems embodying the invention.

Figure 1:
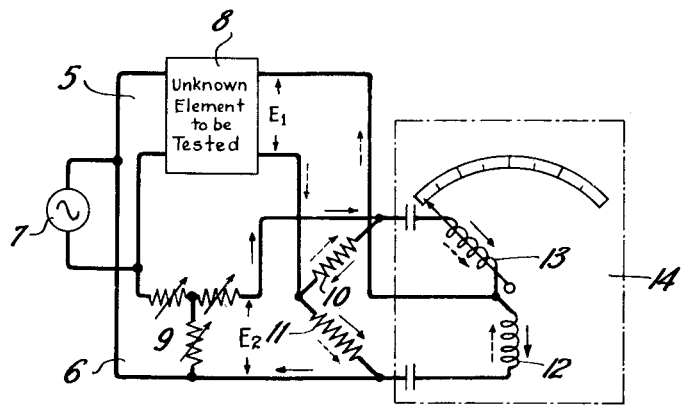
Fig. 1 is a diagrammatic illustration of a system embodying the invention.

In Fig. 1, the test circuit 5 and the calibrating circuit 6 of the testing system are branched in parallel from a suitable source of alternating current 7 of an appropriate frequency.

An element 8 having an unknown transmission equivalent to be measured is included in the circuit branch 5, and a variable attenuator or artificial line 9 is included in the circuit branch 6. The current from source 7 is modified in the branch 5 as to both magnitude and phase by the element 8 under test, and in the branch 6 by the variable attenuator 9.

The branch circuits 5 and 6 are connected to a Wheatstone bridge composed of two ratio arms having equal resistance elements 10 and 11, and two ratio arms including the coils 12 and 13 of a dynamometer 14. Each of the fixed resistances 10 and 11 is made equal to the characteristic impedance of the branch circuits 5 and 6, and each of the coils 12 and 13 of the dynamometer is so resonated and adjusted as to give the same impedance.

The variable attenuator 9 may be adjusted until the voltages in branch circuits 5 and 6 are equal, at which time a zero reading will be obtained on the dynamometer 14 in accordance with the invention, regardless of the phases of the original voltages in the two branches.

The operation of this system depends, in accordance with the invention, upon the basic principle that when two voltages of the same frequency are equal, their sum and difference will be 90 degrees apart in phase, regardless of the phases of the original voltages; and, unless the voltages are equal, their sum and difference cannot be at right angles.

Figure 2:
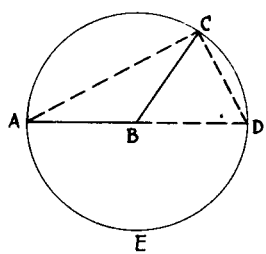
Figs. 2 and 3 are vector diagrams illustrating the principles of operation of the system of Fig. 1.

This principle is illustrated more clearly in connection with the vector diagram of Fig. 2, in which AB and BC are equal vectors making any angle with each other. Vector AB may represent the voltage $E_2$ in branch circuit 6, and vector BC may represent the voltage $E_1$ in the branch 5. Then AC and CD are, respectively, the sum and difference of the vectors, and the angle ACD is a right angle, being inscribed in a semicircumference. Furthermore, the circumference ACDE is the locus of the point C when ACD is a right angle, and, therefore, the sum and difference of vectors AB and BC are at right angles only when the original vectors are equal.

In the system of Fig. 1, it will be apparent that the current due to the voltage $E_1$ (indicated by dotted arrows) will traverse the coils of the dynamometer in parallel, while the current due to the voltage $E_2$ (indicated by solid arrows) will traverse them in series. Hence the currents in the coil 12 will be in opposite senses while in coil 13 they are in the same sense. Therefore the total current in coil 12 is proportional to $E_1 - E_2$, and the total current in coil 13 is proportional to $E_1 + E_2$.

The dynamometer will therefore read zero when the current in one coil is zero, or when the currents in the two coils differ in phase by 90 degrees. The former will be the case only when the voltages $E_1$ and $E_2$ are equal and exactly in phase or 180 degrees out of phase. The latter will be the case, that is, the currents will be 90 degrees out of phase, as already demonstrated, when the voltages $E_1$ and $E_2$ are equal regardless of their relative phases. A zero reading on the dynamometer, therefore, will indicate equality in the voltages in circuit branches 5 and 6.

In the system of Fig. 1, the current in each of the branch circuits 5 and 6 is unaffected by the voltage in the other branch. The impedance looking into the Wheatstone bridge from each branch is equal to the impedance of one of the ratio arms containing resistances 10 and 11, which is the correct terminating impedance, and the currents in the two dynamometer coils are proportional respectively to the sum and difference of voltages $E_1$ and $E_2$. Due to the balance of the bridge there will be no reaction between circuit branches 5 and 6 which would affect the result.

The same result is obtained in the modified system shown in Fig. 4. In this system, a three-winding transformer or hybrid coil 15 serves to couple the dynamometer coils 12 and 13 to circuit branches 5 and 6. The transformer 15 should be practically a perfect transformer, and each of the three windings should be of the same self-impedance.

If desired, the variable artificial line 9 in the calibrating branch 6 may be dispensed with in the systems described above, and the dynamometer 14 may be utilized to give a direct indication of the electrical characteristics of the element under test.

In this case, if the voltages $E_1$ and $E_2$ in the test and calibrating branches of the circuit are not equal, the pull on the dynamometer is proportional to the difference of the squares of the absolute values of the voltages regardless of their relative phases. The significance of this principle, illustrated in connection with the vector diagram of Fig. 3, is that the reading on the dynamometer for differences between the values of the voltages in the two circuit branches is a measure of their relative values regardless of phase.

Figure 3:
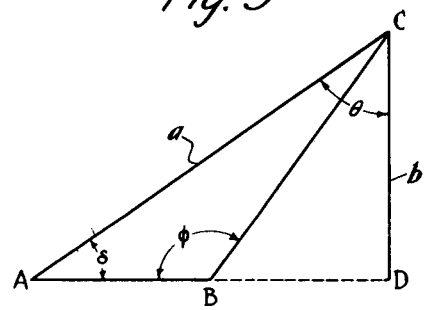

In Fig. 3, let AB equal $E_2$, let BC equal $E_1$, and let AD equal $2E_2$, where AB and BC are voltage vectors. Then AC, which is the vector sum of the vectors AB and BC and which may be represented by the symbol $a$, is equal to $E_1+E_2$. Likewise, CD, which is the vector difference of the vectors AB and BC, and which may be represented by the symbol $b$, is equal to $E_1-E_2$. The force P on the dynamometer may be represented as $$P = Kab \cos \Theta$$

where K is a constant dependent upon the characteristics of branch circuits 5 and 6, and where $\Theta$ is the angle between the vector sum and vector difference.

Assuming all the values in the following equations to be absolute values, it will be evident that:

$$a = \sqrt{E_1^2 + E_2^2 - 2E_1 \cdot E_2 \cos \Phi} \quad (1)$$

$$b = \sqrt{E_1^2 + E_2^2 + 2E_1 \cdot E_2 \cos \Phi} \quad (2)$$

$$ab = \sqrt{(E_1^2 + E_2^2)^2 - 4E_1^2 E_2^2 \cos^2 \Phi} \quad (3)$$

$$a^2 b^2 = (E_1^2 + E_2^2)^2 - 4E_1^2 E_2^2 \cos^2 \Phi \quad (4)$$

in $\triangle ABC$ $$\frac{\sin \delta}{\sin \Phi} = \frac{BC}{AC} = \frac{E_1}{a} \quad (5)$$

in $\triangle ACD$ $$\frac{\sin \Theta}{\sin \delta} = \frac{AD}{CD} = \frac{2E_2}{b} \quad (6)$$

from (5) and (6)

$$\frac{\sin \Theta}{\sin \Phi} = \frac{2E_1 E_2}{ab} \quad (7)$$

$$1 - \cos^2 \Theta = \frac{4E_1^2 E_2^2}{a^2 b^2} \cdot \sin^2 \Phi \quad (8)$$

$$a^2 b^2 \cos^2 \Theta = a^2 b^2 - 4E_1^2 E_2^2 \sin^2 \Phi \quad (9)$$

from (4) and (9)

$$a^2 b^2 \cos^2 \Theta = (E_1^2 + E_2^2)^2 - 4E_1^2 E_2^2 \cos^2 \Phi - 4E_1^2 E_2^2 \sin^2 \Phi \quad (10)$$

$$ab \cos \Theta = \sqrt{E_1^4 + 2E_1^2 E_2^2 + E_2^4 - 4E_1^2 E_2^2 (\cos^2 \Phi + \sin^2 \Phi)} \quad (11)$$

$$ab \cos \Theta = \sqrt{E_1^4 + 2E_1^2 E_2^2 + E_2^4 - 4E_1^2 E_2^2} = \sqrt{E_1^4 - 2E_1^2 E_2^2 + E_2^4} \quad (12)$$

$$ab \cos \Theta = E_1^2 - E_2^2 \quad (13)$$

and therefore $$P = K (E_1^2 - E_2^2) \quad (14)$$

In other words, the force on the dynamometer is proportional to the difference of the squares of the absolute values of the applied voltages regardless of their relative phases. It will be observed that the angle between the voltages does not influence the result. Hence, the reading on the dynamometer for differences between the values of the voltages in the two circuit branches is a direct measure of the difference between their values regardless of phase. The dynamometer may, therefore, be calibrated to read in transmission units, dispensing with the variable artificial line in the calibrating circuit.

In the system of Fig. 5, the voltages $E_1$ and $E_2$ in the branch circuits 5 and 6 are combined on the grids of two vacuum tubes of the thermionic electron discharge type.

The branch 5 containing the unknown element 8 under test is coupled by means of a variable potentiometer 16 and transformer 17, to the input circuit of the tube 18, and by means of potentiometer 16 and transformer 19 to the input circuit of tube 20. The branch circuit 6 is coupled to the input circuit of the tube 18 through a variable potentiometer 21 and transformer 22, and is coupled to the input circuit of the tube 20 by means of the potentiometer 21 and transformer 23, the secondary of which is reversed as compared with that of transformer 22.

The output circuit of the tube 18 is coupled to the dynamometer coil 12 through a transformer 24, and the output circuit of the tube 20 is coupled to the dynamometer coil 13 through the transformer 25. The voltages applied to the dynamometer coils 12 and 13 are thus proportional to the voltages in the output of tubes 18 and 20 which are proportional, respectively, to the sum and difference of the voltages in the two branches of the circuit.

In the system of Fig. 5, since there is no appreciable current flow in the secondaries of the coupling transformers, there will be practically no reaction between the two circuit branches. This system has the further advantage that, since the transformers may be made of high impedance on the primary side, the termination of the two circuit branches will be practically undisturbed by these impedances in parallel with the variable potentiometers 16 and 21. As a result, these potentiometers may take the place of the variable artificial line employed in the calibrating branch of the systems of Figs. 1 and 4. The lower potentiometer 21 would be used if the unknown element 8 under test causes a loss, and the upper potentiometer 16 would be used if the unknown element causes a gain.

Fig. 6 shows a modified vacuum tube circuit which requires fewer transformers than the circuit of Fig. 5. In this case, a balanced circuit comprising two thermionic electron discharge tubes 26 and 27 is employed. The line 5 is coupled to the input of this balanced circuit by means of a transformer 28, and the line 6 is coupled to the amplifier by means of a transformer 29 the secondary of which is connected between the common grid circuit and the midpoint of transformer 28. The voltage step-up of transformer 28 is twice that of the transformer 29, for example the voltage ratios being respectively 1:1 and 1:2. Thus, a voltage $E_1 + E_2$ will be applied to the grid of the tube 26, and a voltage $E_1 - E_2$ will be applied to the grid of the tube 27. The dynamometer coil 13 is coupled to the output circuit of the tube 26 by means of a transformer 30, and the dynamometer coil 12 is coupled to the output circuit of the tube 27 by means of a separate but similar transformer 31.

The invention has been illustrated in connection with certain preferred embodiments thereof, but it will be understood that it is capable of many other modifications widely differing from those herein shown and described, the scope of the invention being defined by the appended claims.

What is claimed is:

1. The method of comparing two voltages which comprises measuring the product of their vector sum, their vector difference, and the cosine of the angle between their sum and difference.

2. The method of comparing two voltage waves of the same frequency which comprises measuring the product of their vector sum, their vector difference, and the cosine of the angle between their sum and difference.

3. The method of electrical testing which comprises transmitting two voltage waves, modifying one of said waves in accordance with an element to be tested, and measuring the product of the vector sum and vector difference and the cosine of the angle between the vector sum and difference of said voltages.

4. The method of electrical testing which comprises transmitting two voltage waves, modifying one of said waves in accordance with an element to be tested, and measuring the product of the vector sum, the vector difference, and the cosine of the angle between the sum and difference of the voltage vectors.

5. The method of electrical testing which comprises transmitting two voltage waves, modifying one of said waves in accordance with an element to be tested, and simultaneously measuring the difference in the squares of the absolute values of said voltage waves.

6. The method of electrical testing which comprises transmitting two alternating voltage waves of the same frequency, modifying one of said waves in accordance with an element to be tested, and simultaneously measuring the difference in the squares of the absolute values of said voltage waves.

7. The method of electrical testing which comprises transmitting a testing current through two circuits, one of which contains an element to be tested, and measuring the product of the vector sum of said voltages, the vector difference, and cosine of the angle between their sum and their difference.

8. The method of electrical testing which comprises transmitting two voltage waves, modifying one of said waves in accordance with an element to be tested, and adjusting the transmission of the other of said waves until the vector sum and vector difference of said voltage waves so modified and adjusted, respectively, form a right angle and utilizing this relation to indicate equivalency between the transmission characteristic of the element to be tested and that of the adjusting means.

9. The method of electrical testing which comprises transmitting two voltage waves, modifying one of said waves in accordance with an element to be tested, modifying the other wave in accordance with a variable calibrator, and adjusting the transmission of the last mentioned wave until the vector sum and vector difference of said voltage waves so modified and adjusted, respectively, form a right angle and utilizing this relation to indicate equivalency between the transmission characteristic of the element to be tested and that of the variable calibrator.

10. A system of electrical testing comprising a source of testing current, means for deriving two voltage waves from said source, and means for measuring the product of the voltage vector sum, and vector difference, and the cosine of the angle between their sum and difference.

11. A system of electrical testing comprising a source of alternating current, means for deriving two voltage waves of the same frequency from said source, an indicator, and means for controlling said indicator in accordance with the sum of the voltage vectors, the difference of the voltage vectors, and the cosine of the angle between the vector sum and vector difference.

12. A system of electrical testing comprising a source of testing current, a test circuit and a calibrating circuit associated therewith, an indicating device, and means for simultaneously impressing the sum and difference of the voltages in said circuits upon said indicating device.

13. A system of electrical testing comprising a source of testing current, a test circuit and a calibrating circuit associated therewith for adjusting the voltages in said circuits to equality, and means for directly indicating equality in said voltages in said circuits regardless of their relative phases.

14. An electrical testing system comprising a source of testing current, a test circuit and a calibrating circuit associated therewith, means for adjusting the voltage in said calibrating circuit to equal the voltage in said test circuit, and means for directly indicating equality in the voltages in said circuits regardless of their relative phases.

15. An electrical testing system comprising a source of testing current, a test circuit and a calibrating circuit associated therewith, and means for measuring the product of the vector sum and the vector difference of the voltages in said circuits and the cosine of the angle between said vector sum and difference.

16. A system of electrical testing comprising a source of alternating current, a test circuit and a calibrating circuit branched in parallel from said source, an element to be tested in said test circuit, a variable attenuator in said calibrating circuit, and an indicating device having actuating coils differentially connected to said test and calibrating circuits.

In witness whereof, I hereunto subscribe my name this 30th day of December A. D., 1924.

FRANCIS A. HUBBARD.